May 19, 1936.  A. R. LE MOON  2,041,660
VEHICLE AXLE ALIGNER
Filed Aug. 4, 1934
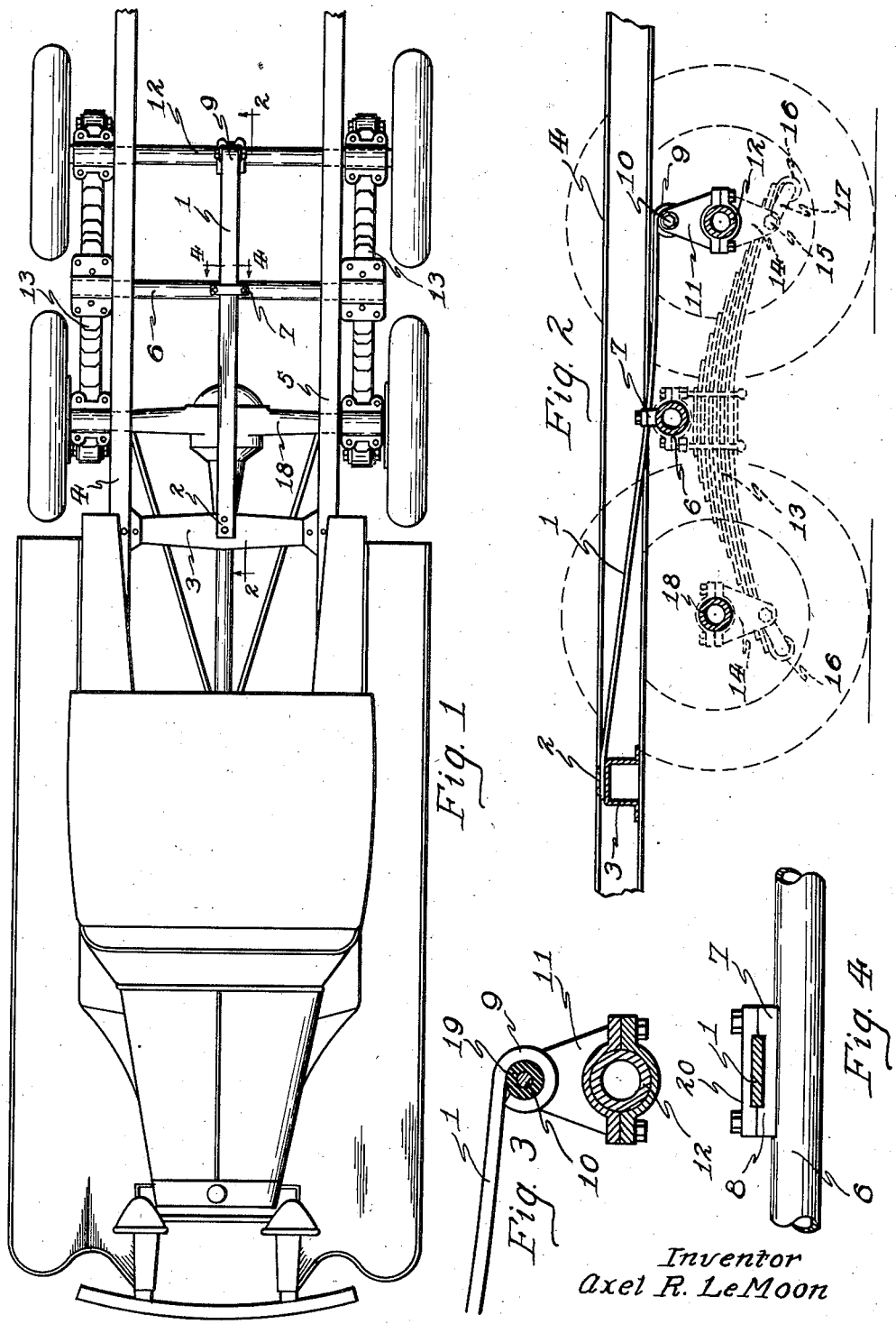
Inventor
Axel R. LeMoon Patented May 19, 1936

2,041,660

UNITED STATES PATENT OFFICE 2,041,660

VEHICLE AXLE ALIGNER

Axel R. Le Moon, Chicago, Ill., assignor to Nelson-Le Moon Truck Co., Chicago, Ill., a corporation of Illinois Application August 4, 1934, Serial No. 738,567

4 Claims. (Cl. 280—124)

This invention relates to motor trucks particularly of the class which are provided with additional axles for enabling a truck of a certain class to carry heavier loads than is possible without an added axle.

More particularly the invention relates to a means for maintaining the added axle against lateral displacement due to the flexible mounting of the axle on springs and also due to ultimate wear of the axle supporting elements.

The purpose of the invention is to provide improved means for maintaining a non-drive load supporting axle against lateral displacement without interfering with its freedom of action against spring resistance in raising or lowering with reference to the machine frame and having the required motion on a vertical axis to enable the axle to adjust itself to the radius of a curved path of travel of the vehicle.

The purpose of the invention is accomplished by means of a construction as illustrated in the drawing, wherein:

Figure 1 is a plan view of a vehicle equipped with the improvement.

Fig. 2 is an enlarged fragmentary sectional view as indicated by the line 2—2 of Fig. 1.

Fig. 3 is a sectional detail showing a provision for slight turning of the axle on a vertical axis.

Fig. 4 is a detail partly in section as indicated by line 4—4, Fig. 1, showing a frame seat for an axle restraining element.

In the mounting of additional axles such as third axles having only a load supporting function, it is common practice to support the load on these non-turning axles through springs and with or without radius rods for maintaining proper alignment of the axle and also for allowing some freedom of motion thereof as required in the up-and-down movement or tilting movement of the axle with reference to the machine frame.

Some of the constructions as designed, permit a slight axial motion of the axle in addition to the intended freedom to adjust itself with reference to the radii of curves around which the vehicle may travel.

It is found that any axial motion of the axle is detrimental particularly to the tires, and this motion sometimes occurs due to wear in the spring journals or supports whereby the springs are mounted on the vehicle frame.

The present improvement is for the purpose of resisting the effects due to wear or any tendency of the third axle to move laterally with reference to the vehicle frame.

The particular improved means provided for this purpose is an axle restraining element extending lengthwise of the vehicle and centrally located between its side frames. This member is mounted, against lateral displacement, at two points on the vehicle frame and also at one end is pivotally connected to a vertical arm rigid with the axle.

This member is made of steel and sidewise is of sufficient thickness to prevent any flexing in that direction. This restraining member, however, may be twisted against its own resilient reaction and may be sprung upwardly or downwardly with reference to its attachment to the vehicle frame. It likewise has an eye connection with the arm on the axle which includes a resilient bushing and enables slight pivotal motion of the axle around a vertical axis.

Such arrangement as described proves to be a practical, durable and simple way of greatly prolonging the life of tires on third axles and maintaining the mechanism in its original setting to offset the effect of wear on such mechanism. The improvement herein described is used in connection with an axle mounting disclosed in patent to Axel R. Le Moon No. 2,002,152, of May 21, 1935.

In the drawing the central axle restraining element is a heavy flat steel bar 1, secured at 2 to the transverse channel bar 3 connecting the side elements 4 and 5 of the vehicle frame. The vehicle frame is also reinforced by the transverse frame tube 6 which carries a seat 7 for the bar 1. The seat 7 has upwardly extending flanges 8 for preventing lateral displacement of the bar. At its rear end bar 1 terminates in an eye 9 encircling a bolt 10 carried in the forked upper end of arm 11 clamped to the third axle 12 and extending vertically therefrom at right angles to the fore-and-aft line of thrust of the vehicle drive mechanism. Between the bolt 10 and the eye 9 is a resilient bushing 19 which allows for a slight but desirable pivotal motion of the axle around a central vertical axis. The bar 1 is so dimensioned that it may be slightly twisted during tilting motions of the axle. It also may be sprung upwardly and downwardly as the axle moves up and down. The bar 1 is secured to the machine frame against relative movement thereof at its forward end 2, but its mounting in seat 7 is such as to allow for a slight sliding motion of the bar in the seat, because the bar there rests at a point spaced from the axis of tube 6 around which the axle 12 swings with springs 13. The bar 1 is retained in the seat 7 by a steel strap 20 on the top of flanges 8.

This central restraining element has utility in various types of axle mountings. The preferred one shown includes the springs 13 journaled upon the ends of the transverse tubular frame member 6 which extend beyond the side frames 4 and 5. The axle 12 has rigidly clamped thereon depending forked brackets 14 which carry transverse bolts 15 upon which the springs rest inwardly of their rear ends. The main spring leaves have eyes 16 with shackle connections 17 to bolts 15. These shackle connections serve to transmit part of the thrust between the vehicle frame and the axle, but have no load supporting function as the springs rest upon the bolts 15.

The opposite ends of the springs may have similar connections to the housings 18 for the vehicle drive axle or axles.

In the operation of the construction the restraining element 1 for the third axle 12 may move up or down with the axle and resiliently resist lateral tilting thereof, but due to the width and mounting of element 1 it is highly resistant to any lateral shifting of axle 12, and serves to maintain this axle in that regard in alignment with the drive axle, and cause the wheels on axle 12 to faithfuly track the wheels on the drive axles. When such alignment is maintained it is found that scuffing of the tires is minimized and more useful service can be had from the tires. The desired effect is attained even though some wear does occur between the spring mountings and the transverse frame member 6 which carries the springs.

Although but one specific embodiment of the invention has been herein described, details thereof may be altered without departing from this invention as defined by the claims.

I claim:

1. In a vehicle, a frame structure and driving means for the vehicle, a non-driving supporting axle and wheels thereon, resilient connections between the vehicle frame and the non-driving axle permitting up and down motions of the axle and lateral tilting thereof, and additional restraining means for said non-driving axle for preventing lateral shifting of said axle, said restraining means comprising a member extending longitudinally of the vehicle frame midway between the sides of the frame and mounted thereon to be supported at two spaced points on the vehicle frame, a vertical arm rigid with said non-driving axle and having a pivotal connection on a horizontal axis with one end of said restraining means.

2. In a vehicle, a frame structure and driving means for the vehicle, a non-driving supporting axle and wheels thereon, resilient connections between the vehicle frame and the non-driving axle permitting up and down motions of the axle and lateral tilting thereof, and additional restraining means for said non-driving axle for preventing lateral shifting of said axle, said restraining means comprising a member extending longitudinally of the vehicle frame midway between the sides of the frame and mounted thereon to be supported at two spaced points on the vehicle frame, a vertical arm rigid with said non-driving axle and having a pivotal connection on a horizontal axis with one end of said restraining means, said pivotal connection including a resilient bushing whereby a slight turning of the axle on a central vertical axis is possible.

3. In a vehicle a frame structure, an axle and wheels thereon for supporting said frame structure, said axle being connected to the frame by springs mounted on the frame near its sides and extending to said axle, a restraining member for said axle designed to restrain the axle against lateral displacement, said restraining member extending longitudinally of the machine frame and located centrally between its sides and having one end rigidly connected with the machine frame and its opposite end being pivotally connected with the axle, said axle being provided with a rigid vertical arm forming part of said pivotal connection, a support on the machine frame for said restraining member arranged for preventing displacement of said restraining member in all directions except longitudinally of said restraining member.

4. In a vehicle, an axle having depending elements constructed to afford a rest or fulcrum for a load carrying spring, a frame structure, a spring extending from said frame structure over said fulcrum, a shackle connecting the end of the spring with said depending element, and a restraining member for said axle designed to restrain the axle against lateral displacement, said restraining member extending longitudinally of the machine frame and secured thereto, an arm fixed to said axle and extending vertically therefrom to said restraining member, and a pivotal connection between said restraining member and said arm, said pivotal connection having a transverse horizontal axis.

AXEL R. LE MOON.